UNITED STATES PATENT OFFICE.

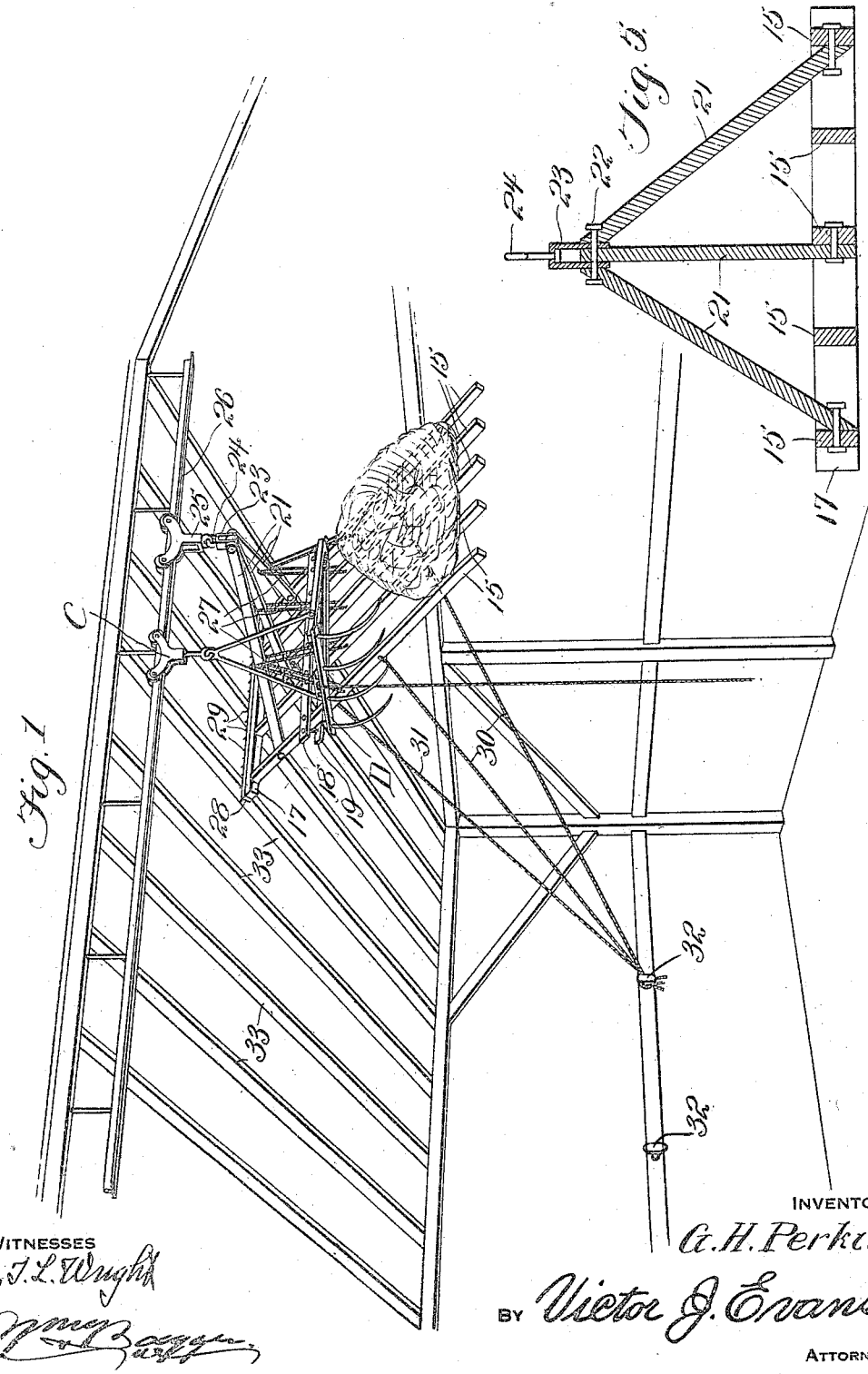

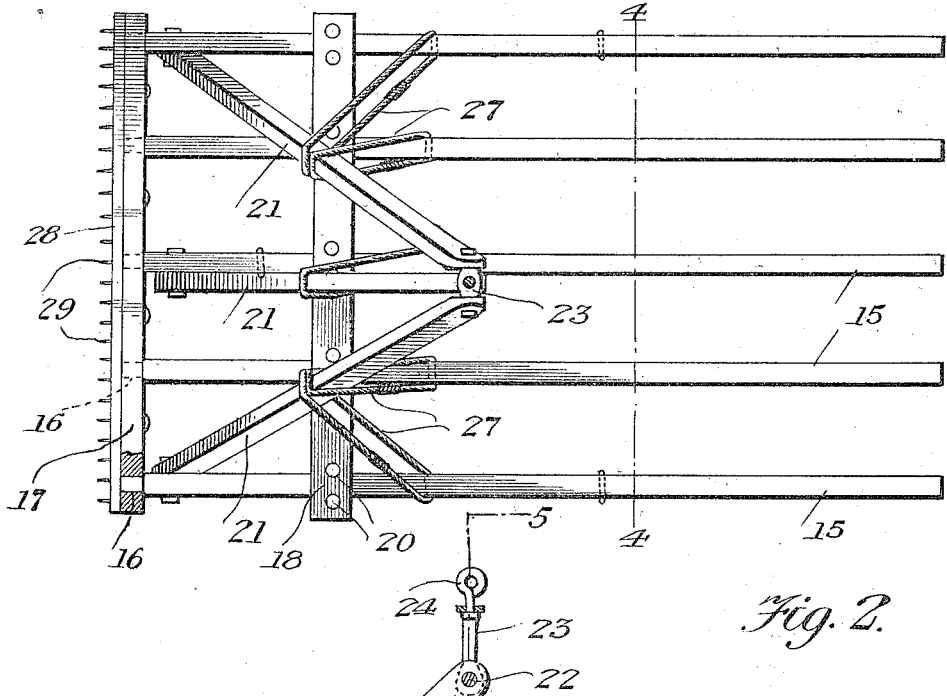
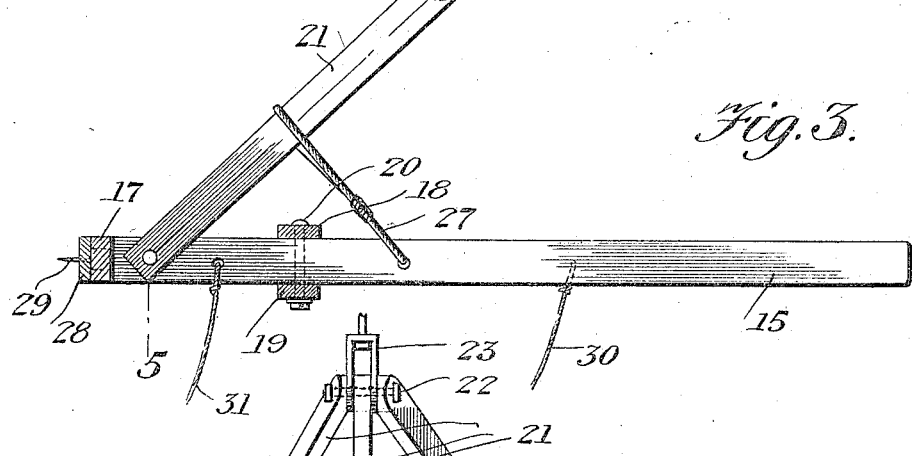
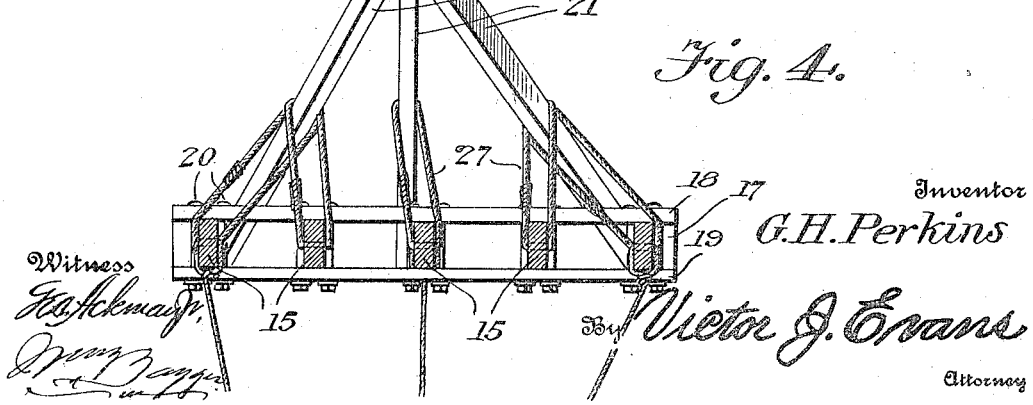

GARDNER H. PERKINS, OF CAZENOVIA, NEW YORK.

DEVICE FOR MOWING HAY.

1,242,853.  Specification of Letters Patent.  Patented Oct. 9, 1917.

Application filed January 3, 1917. Serial No. 140,414.

*To all whom it may concern:*

Be it known that I, GARDNER H. PERKINS, a citizen of the United States, residing at Cazenovia, in the county of Madison and State of New York, have invented new and useful Improvements in Devices for Mowing Hay, of which the following is a specification.

This invention relates to devices for mowing hay, grain and the like, and it has for its object to produce a device known as a mower of simple and improved construction which may be suspended from a car running on a track beneath the ridge pole of a barn or mow, said mower being adapted to receive a load deposited thereon by an ordinary hay fork for the purpose of depositing such load on the mow in the most desirable position.

A further object of the invention is to so construct and arrange the mower that it may be rotated about a vertical axis for the purpose of depositing the load in the desired direction, and tilted to any desired extent so that the load may gravitationally slide the desired distance away from the mower so that it may be deposited in the most desirable location.

A further object of the invention is to so construct the mower that it may be held in a steady condition while receiving the load of hay from the hay fork or other source and while guiding such load to the desired place.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a perspective view showing the improved device mounted in position for operation.

Fig. 2 is a top plan view of the mower.

Fig. 3 is a side elevation.

Fig. 4 is a transverse sectional view taken on the line 4—4 in Fig. 2.

Fig. 5 is a transverse sectional view taken on the line 5—5 in Fig. 3.

Corresponding parts in the several figures are denoted by like characters of reference.

The improved mower is composed mainly of a plurality of bars 15 provided at their rearward ends with tenons 16 engaging recesses or mortises in a cross bar 17 whereby the rearward ends of the bars 15 are assembled in equidistantly spaced relation. Transverse top and bottom bars 18, 19 extend across the longitudinal bars 15, said top and bottom bars being clamped on the bars 15 by means of clamp bolts 20 which are arranged adjacent to the side faces of the bars 15, the latter being thereby securely assembled without weakening said bars by bolt holes or the like. Pivotally connected with the bars 15 near the rear ends thereof are arms 21 that extend obliquely in an upward and forward direction, said arms being forwardly converged and connected together near their upper front ends by means of a bolt 22 having a clevis 23, said clevis being preferably constructed to include a swivel joint 24 about the axis of which the mower may rotate. The mower is suspended by the clevis 23 from a car 25 traveling on a track 26 beneath the ridge pole of a barn or other structure, said track being the same which is provided for the use of the car C of an ordinary conventional hay fork, the latter being shown at D. Connected with each of the bars 15 in advance of the transverse bars 18, 19 is a loop 27 of wire, wire rope or the like, said loop encircling one of the arms 21. This construction permits the forward ends of the bars 15 to swing upwardly with respect to the arms 21, while movement in a downward direction of the forward ends of the bars 15 will be limited by the presence of said loops.

Secured on the rearward face of the rear cross bar 17 is a facing bar 28 having rearwardly extending spikes 29, the purpose of which will be presently set forth. Secured to the outermost bars 15 well in advance of the cross bars 18, 19 are hand ropes 30, and a similar hand rope 31 is secured to one of the bars 15 to the rearward of the cross bars 18 and 19, intermediate the same and the rear cross bar 17. By means of these three ropes the mower may be manipulated by pulling the same so as to cause the car 25 to travel in either direction along the track. The mower may also by means of said ropes be rotated about the axis of the swivel member 24, or it may be held steady to prevent rotation. Cleats 32 with which the ropes may be connected for the purpose of holding the mower steady in adjusted position may also be provided in suitable locations along the walls of the barn.

The track 26 on which the car 25 is mounted may, as stated, be the same track which is usually provided for the traveling car C of an ordinary conventional hay fork D, in connection with which the present invention is intended to be used.

In the operation of the invention, the mower is first moved along the track to the position where it is to be used. The hand ropes are now utilized to swing the mower about the axis of the swivel member 24 until the free ends of the bars 15 point in the direction where it is desired to discharge the hay or grain. The hand ropes are next utilized to tilt the mower until the bars 15 occupy a more or less inclined position which, it is judged, will guide material deposited thereon in the proper direction, a swinging movement being also imparted to the mower, whereby the spikes 29 will be caused to engage some of the roof rafters, the latter being shown at 33, thus preserving the inclined position of the bars of the mower which will be further securely maintained in position by connecting the hand ropes with one of the cleats 32. The mower, being now in substantially the position indicated in Fig. 1, is ready for operation. When a load of hay arrives, the fork or carrying implement D is moved along the track 26 to a position as closely as possible adjacent to the mower constituting the present invention, after which the load is dumped on the bars 15 of said mower, being thereby guided or deflected, as desired, in the direction of one side of the barn. Any desired number of loads may thus be deposited before the position of the mower is changed. When this is to be done the hand ropes are detached from the cleat and utilized, by pulling thereon, to disengage the spikes from the roof rafters, after which the mower may be rotated about the axis of the swivel member 24 or moved along the track to the next desired position, after which it is again made fast, and the operation repeated.

When hay, grain or the like is deposited directly on the mow by means of a fork or other instrumentality, it will be dumped on the center of the mow or along the central medial line, thereby throwing the heaviest weight along such medial line which will thus become packed to a degree much in excess of the sides of the mow, thereby causing mow burning and great deterioration in value of the material. The only way to avoid this is by manually throwing the material from the center to the sides of the mow, thus involving double handling at a great expense of labor. By the use of the improved mowing device the material may be deposited as closely adjacent to the sides of the mow as may be desired in a simple, convenient and labor-saving manner, and the packing of the central portion of the mow by depositing heavy loads directly thereon will be entirely avoided.

Having thus described the invention, what is claimed as new, is:—

1. A mower comprising a plurality of longitudinal bars having tenons at their rearward ends, a rear cross bar having recesses receiving the tenons, intermediate transverse top and bottom bars, clamp bolts positioned adjacent to the side faces of the longitudinal bars and assembling the same with the top and bottom bars, and suspending means including upwardly and forwardly converging arms connected pivotally with the longitudinal bars to the rearward of the transverse top and bottom bars, and means for limiting the swinging movement of the longitudinal bars relative to said arms.

2. A mower comprising a plurality of longitudinal bars having tenons at their rearward ends, a rear cross bar having recesses receiving the tenons, intermediate transverse top and bottom bars, clamp bolts positioned adjacent to the side faces of the longitudinal bars and assembling the same with the top and bottom bars, and loops connected with the longitudinal bars and surrounding the oblique arms to limit the swinging movement of the longitudinal bars relative to said arms.

3. A mower composed of a plurality of longitudinal bars, a rear cross bar, intermediate top and bottom bars and clamp bolts whereby the parts are assembled, upwardly and forwardly convergent arms pivotally connected with some of the longitudinal bars to the rearward of the transverse top and bottom bars, means for limiting the swinging movement of the longitudinal bars with respect to said arms, means connected with the arms for suspending the mower, a movably supported car from which the mower is suspended, and hand ropes connected with the longitudinal bars of the mower to the forward and to the rearward of the transverse top and bottom bars.

4. In a device of the class described, a movably supported car, a mower comprising suitably connected and assembled longitudinal bars, forwardly and upwardly convergent arms pivotally connected therewith, means for limiting the swinging movement of the longitudinal bars relatively to the arms, and hand ropes connected with the longitudinal bars to control the tilting movement thereof in any direction, and means including a swivel device for suspending the mower from the car.

5. In a device of the class described, a movably supported car, a mower comprising suitably connected and assembled longitudinal bars, forwardly and upwardly convergent arms pivotally connected therewith, means for limiting the swinging movement of the longitudinal bars relatively to the arms, and hand ropes connected with the longitudinal bars to control the tilting movement thereof in any direction, and means including a swivel device for suspending the mower from the car, said mower being provided with rearwardly extending spikes.

6. In a device of the class described, a movably supported car, and a tiltable mower suspended from said car, said mower being provided with rearwardly extending spikes and with hand ropes whereby it may be manipulated.

In testimony whereof I affix my signature.

GARDNER H. PERKINS.

Copies of this patent may be obtained for five cents each, by addressing the "Commissioner of Patents, Washington, D. C."